US008953095B2

(12) United States Patent
Liaw

(10) Patent No.: US 8,953,095 B2
(45) Date of Patent: Feb. 10, 2015

(54) FLASH LIGHT DEVICE

(75) Inventor: Ming-Jiun Liaw, Miaoli County (TW)

(73) Assignee: Altek Corporation, Hsinchu (TW)

(*) Notice: Subject to any disclaimer, the term of this patent is extended or adjusted under 35 U.S.C. 154(b) by 233 days.

(21) Appl. No.: 13/530,090

(22) Filed: Jun. 21, 2012

(65) Prior Publication Data

US 2013/0278819 A1    Oct. 24, 2013

(30) Foreign Application Priority Data

Apr. 20, 2012  (TW) .............................. 101114216 A

(51) Int. Cl.
| | |
|---|---|
| H04N 5/222 | (2006.01) |
| H04N 9/07 | (2006.01) |
| A61B 1/06 | (2006.01) |
| G03B 15/02 | (2006.01) |
| G03B 15/03 | (2006.01) |
| G03B 15/06 | (2006.01) |
| G03B 19/18 | (2006.01) |
| G03B 21/00 | (2006.01) |

(52) U.S. Cl.
USPC ............... 348/371; 348/68; 348/69; 348/258; 348/259; 348/261; 396/61; 396/62; 396/108; 396/109; 396/155; 352/49; 352/198; 352/199; 352/200; 352/201

(58) Field of Classification Search
None
See application file for complete search history.

(56) References Cited

U.S. PATENT DOCUMENTS

| | | | | |
|---|---|---|---|---|
| 5,614,970 | A * | 3/1997 | Takagi et al. ................. | 396/164 |
| 8,604,708 | B2 * | 12/2013 | Liaw .......................... | 315/241 P |
| 2006/0039160 | A1 | 2/2006 | Cassarly et al. | |
| 2008/0199172 | A1 * | 8/2008 | Hamada ....................... | 396/157 |
| 2009/0160944 | A1 * | 6/2009 | Trevelyan et al. ............ | 348/187 |
| 2010/0165178 | A1 * | 7/2010 | Chou et al. .................... | 348/371 |
| 2011/0157895 | A1 * | 6/2011 | Alenius et al. ................ | 362/293 |

FOREIGN PATENT DOCUMENTS

| | | |
|---|---|---|
| CN | 2927109 Y | 7/2007 |
| CN | 102138103 A | 7/2011 |
| TW | 369619 | 9/1999 |
| TW | 201018850 A | 5/2010 |
| TW | 201031989 A | 9/2010 |

OTHER PUBLICATIONS

"Office Action of Taiwan Counterpart Application", issued on Dec. 25, 2013, p. 1-p. 4.

* cited by examiner

*Primary Examiner* — Roberto Velez
*Assistant Examiner* — Quan Pham
(74) *Attorney, Agent, or Firm* — Jianq Chyun IP Office

(57) ABSTRACT

The invention provides a flash light device, which includes a light source, a light diffuser and a light diffuser's driving unit. The light diffuser's driving unit provides the light diffuser with a required driving voltage according to a voltage information, in which the voltage information is determined according to an original image without light-complementing of the light source and a pre-flash image with light-complementing of the light source.

8 Claims, 13 Drawing Sheets

US 8,953,095 B2

FLASH LIGHT DEVICE

CROSS-REFERENCE TO RELATED APPLICATION

This application claims the priority benefit of Taiwan application serial no. 101114216, filed on Apr. 20, 2012. The entirety of the above-mentioned patent application is hereby incorporated by reference herein and made a part of this specification.

BACKGROUND OF THE INVENTION

1. Field of the Invention

The invention generally relates to a flash light device, and more particularly, to a flash light device able to reduce the over-exposure problem.

2. Description of Related Art

In general speaking, both the digital camera and the film-based camera usually respectively have an embedded flash light to facilitate the user conducting light-complementing on the object to be shot in a dim light environment or a backlight environment. Since a flash light has a light intensity much higher than the environment's light intensity, so that when a flash light directly irradiates onto an object, if the flash light is too close to the object or the material of the object has easily-reflecting characteristic, the captured image is likely over-exposed.

FIG. 1 is a schematic flowchart of the flashing process of a conventional flash light. Referring to FIG. 1, in order to conduct light-complementing on an object to be shot by using a flash light, first, an original image without conducting light-complementing on the object to be shot by using the flash light is captured (step S102). Next, a pre-flash image is captured by using the flash light to conduct pre-flashing (step S104). Thereafter, the reflectivity of each pixel of the object to be shot is calculated according to the original image and the pre-flash image (step S106). Then, the flashing intensity of the flash light is determined according to a reflectivity of the object (step S108). Finally, the flash light is triggered for conducting light-complementing (step S110).

Although in step S104, for estimating the flashing intensity of the flash light required during shooting, a pre-flash method is used, but the flashing intensity of the flash light is not stable. Even though a same driving voltage and a same discharging time are given each time, the flashing intensity of the flash light is somehow different from time to time, as shown by FIG. 2 which illustrates the flashing intensities of the flash light during a test. In FIG. 2, all coordinate points are obtained by using the same driving voltage and the same discharging time for driving the flash light, but it is obvious the variation of the light energy of the flash light is quite large. Therefore, if light-complementing is conducted by using the same driving voltage to apply the flash light, it is possible to have two extreme situations of over-diming (the flashing intensity falls at, for example, point A) or over-exposing (the flashing intensity falls at, for example, point B). In this regard, how to effectively improve the light-complementing quality of a flash light has become an issue to be solved.

US Patent Application No. US2007/0121072 discloses a scheme, in which a liquid crystal lens (LC lens) is used to change the energy distribution of a flash light according to a distance between the object to be shoot and the LC lens. When the distance is short, i.e., the lens is close to the object to be shoot, the LC lens is driven to present a first distribution of indices of refraction so as to disperse the energy of the flash light, i.e., to avoid the above-mentioned over-exposing problem; on the contrary, when the object to be shoot is more far away from the lens, the LC lens is driven to present a second distribution of indices of refraction so as to concentrate the energy of the flash light, i.e., to concentrate the energy of the flash light on the object to be shoot. In this way, although the energy output of the flash light can be controlled to solve the over-exposing problem due to the distance between the object and the lens, however, it is unable to effectively reduce the over-exposing for an object with high reflectivity.

SUMMARY OF THE INVENTION

Accordingly, the invention is directed to a flash light device able to reduce the over-exposure problem.

The invention provides a flash light device, which includes a light source, a light source's driving unit, a light diffuser and a light diffuser's driving unit. The light source's driving unit is coupled to the light source and receives a trigger signal to drive the light source for emitting light energy. The light diffuser is disposed in front of the light source and includes a plurality of first sub-blocks, in which each of the first sub-blocks is respectively controlled by a corresponding driving voltage so as to adjust the light penetration energy of each of the first sub-blocks. The light diffuser's driving unit is coupled to the light diffuser, receives a set of voltage information and produces and provides the driving voltage corresponding to each of the first sub-blocks according to the set of voltage information, in which the set of voltage information is for indicating the required driving voltage corresponding to each of the first sub-blocks in the light diffuser, and the driving voltage is determined according to an original image without light-complementing of the light source and a pre-flash image with light-complementing of the light source.

In an embodiment of the present invention, the above-mentioned light diffuser's driving unit is further coupled to a primary control chip of digital capturing system, in which the required driving voltage corresponding to each of the first sub-blocks in the light diffuser is determined by the primary control chip of digital capturing system, and the primary control chip of digital capturing system transmits the required voltage information corresponding to each of the first sub-blocks to the light diffuser's driving unit.

In an embodiment of the present invention, the above-mentioned primary control chip of digital capturing system determines the driving voltage corresponding to each of the first sub-blocks in the light diffuser through performing following steps: (a) capturing an original image without light-complementing of the light source; (b) capturing a first pre-flash image with light-complementing by using a presetting first light source energy; (c) deriving reflection energy ratio of each pixel by using the original image and the first pre-flash image; (d) determining a second light source energy according to the result of step (c); (e) deriving the exposure value of each pixel of an image after light-complementing with the second light source energy according to the results of steps (c) and (d), in which at least one second sub-block is defined on the image after light-complementing with the second light source energy, and each of the second sub-blocks corresponds to one of a plurality of first sub-blocks at the light diffuser; (f) determining the driving voltage of each of the first sub-blocks according to the result of step (e).

In an embodiment of the present invention, the above-mentioned step (f) performed by the primary control chip of digital capturing system further includes: (g) calculating the pixel number of over-exposure in each the second sub-block in the image after light-complementing with the second light source energy; (h) determining the driving voltage of each of the first sub-blocks according to the result of step (g) and a lookup table (LUT) or a formula, in which the more the pixel number of over-exposure in the second sub-block is, the lower the penetration of the corresponding first sub-block of the light diffuser must be.

The invention also provides a flash light device, which includes a light source, a light source's driving unit, a light diffuser and a light diffuser's driving unit. The light source is configured for emitting a flash light. The light source's driving unit is coupled to the light source and receives a trigger signal to drive the light source for emitting light energy. The light diffuser receives the flash light, in which the light penetration energy of the light diffuser is controlled by a driving voltage. The light diffuser's driving unit is coupled to the light diffuser, receives a voltage information and produces and provides the driving voltage required by the light diffuser according to the voltage information, in which the voltage information is determined according to an original image without light-complementing of the light source and a pre-flash image with light-complementing of the light source.

In an embodiment of the present invention, the above-mentioned light diffuser's driving unit is further coupled to a primary control chip of digital capturing system, in which the driving voltage required by the light diffuser is determined by the primary control chip of digital capturing system, and the primary control chip of digital capturing system transmits the voltage information required by the light diffuser to the light diffuser's driving unit.

In an embodiment of the present invention, the above-mentioned primary control chip of digital capturing system determines the driving voltage of the light diffuser through performing following steps: (a) capturing an original image without light-complementing of the light source; (b) capturing a first pre-flash image with light-complementing by using a presetting first light source energy; (c) deriving reflection energy ratio of each pixel by using the original image and the first pre-flash image; (d) determining a second light source energy according to the result of step (c); (e) deriving the exposure value of each pixel of an image after light-complementing with the second light source energy according to the results of steps (c) and (d); (f) determining the driving voltage of the light diffuser according to the result of step (e).

In an embodiment of the present invention, the above-mentioned step (f) performed by the primary control chip of digital capturing system further includes: (g) calculating the pixel number of over-exposure in the image after light-complementing with the second light source energy; (h) determining the driving voltage of the light diffuser according to the result of step (g) and a lookup table (LUT) or a formula, in which the more the pixel number of over-exposure is, the lower the penetration of the light diffuser must be.

In an embodiment of the present invention, the above-mentioned light diffuser is polymer-dispersed liquid crystal display (PDLC Display), liquid crystal display (LCD) or LCD by adding PDLC droplets.

Based on the description above, the invention provides a driving voltage required for driving the light diffuser according to a voltage information so as to adjust the light energy of the flash light after penetrating the light diffuser and reduce the over-exposure problem. The voltage information herein is determined according to an original image without light-complementing of the light source and a pre-flash image with light-complementing of the light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
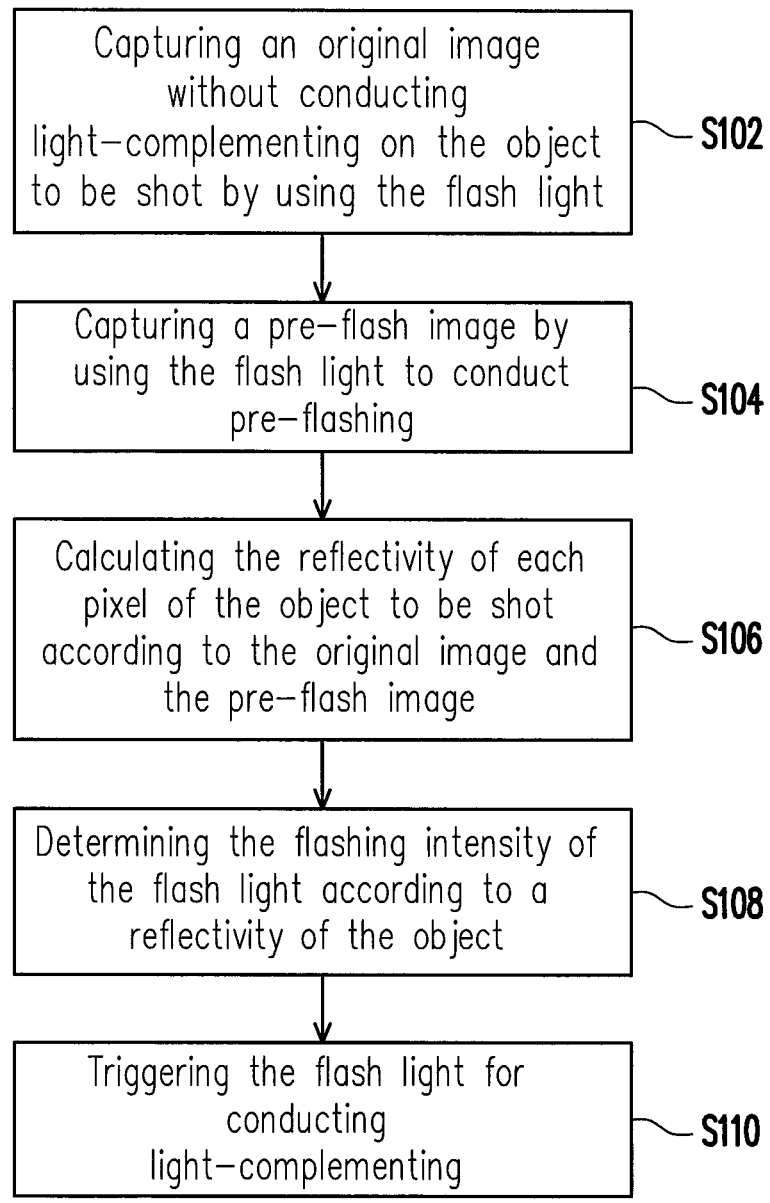
FIG. 1 is a schematic flowchart performed by a software and a firmware of a conventional flash light.
Figure 2:
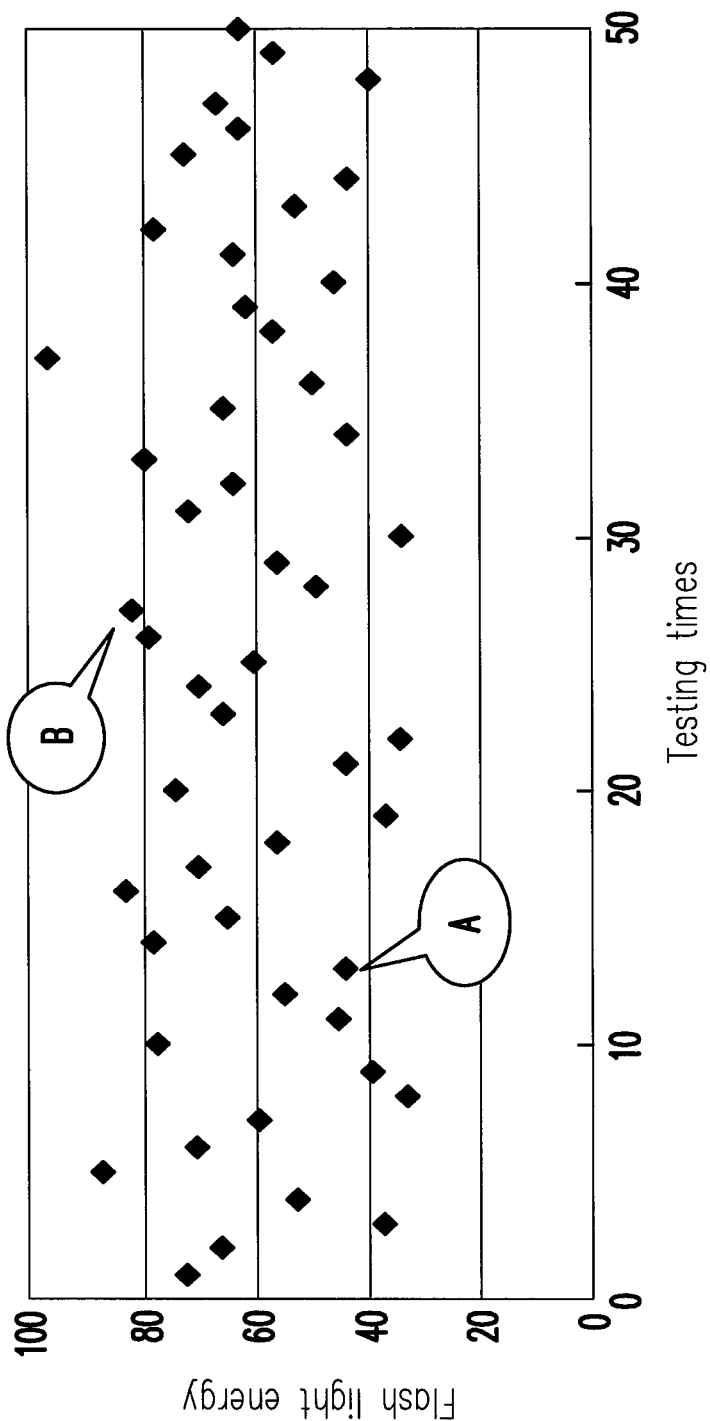
FIG. 2 is a plot illustrating the energy variation of a conventional flash light during a test.
Figure 3:
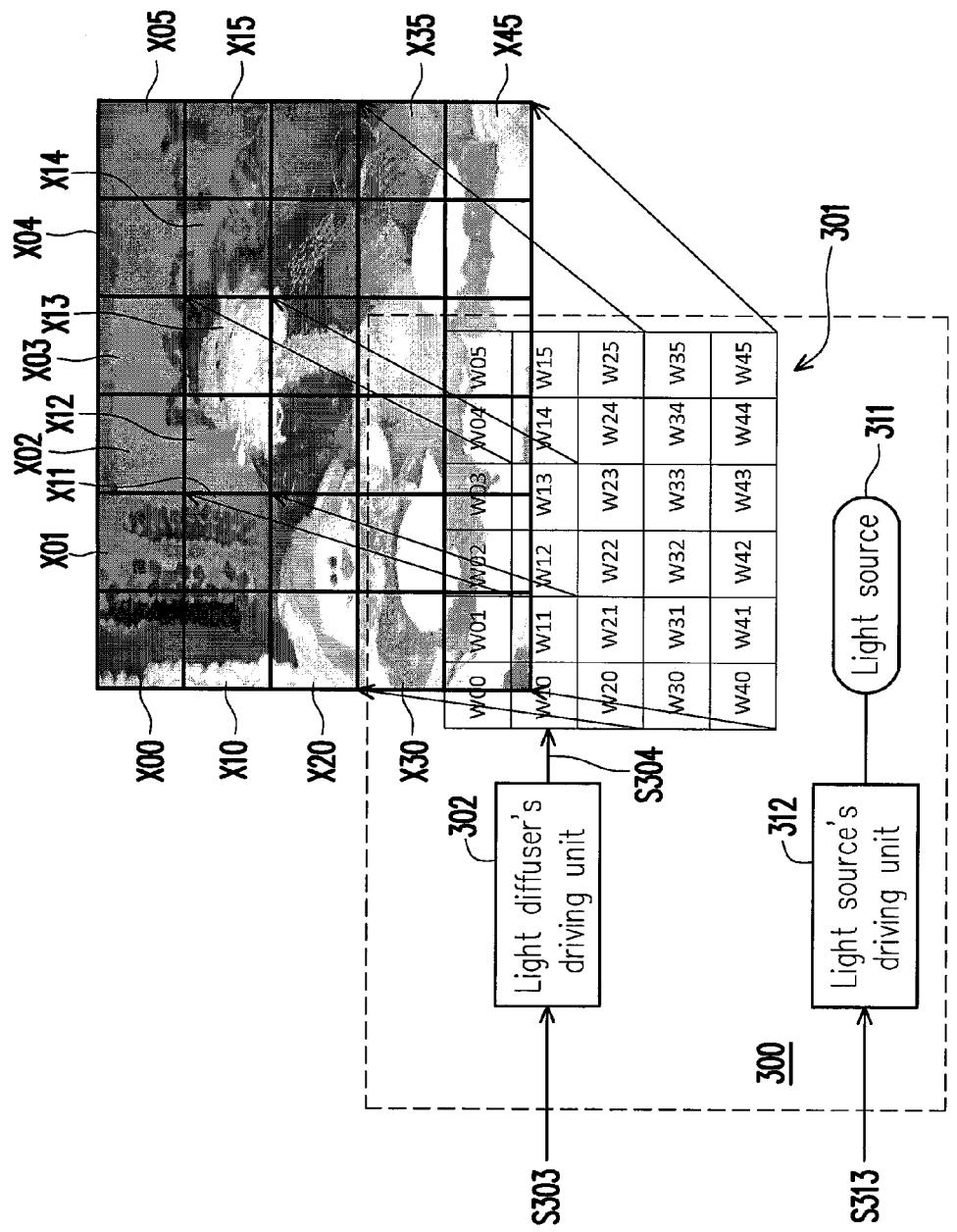
FIG. 3 is a schematic diagram of a flash light device according to an embodiment of the invention.

FIG. 3 is a schematic diagram of a flash light device according to an embodiment of the invention. Referring to FIG. 3, a flash light device 300 includes a light diffuser 301, a light diffuser's driving unit 302, a light source 311 and a light source's driving unit 312. The light diffuser's driving unit 302 is coupled to the light diffuser 301 and receives a set of voltage information S303. The set of voltage information S303 indicates a plurality of driving voltages S304 required by the light diffuser 301. The light diffuser's driving unit 302 produces the driving voltages S304 and apply the driving voltages S304 with a certain control timing to the light diffuser 301. The light source's driving unit 312 is coupled to the light source 311 and receives a trigger signal S313 so as to adjust the time for the light source 311 to produce flashing or the flash intensity.

The light diffuser 301 herein includes a plurality of sub-blocks (as shown by FIG. 3, W00-W45). Each of the sub-blocks is respectively controlled by a corresponding driving voltage so as to adjust the light energy of the flash light after penetrating each the above-mentioned sub-block. The sub-blocks W00-W45 are corresponding to a plurality of sub-blocks of the scene to be shot X00-X45.

After the light diffuser's driving unit 302 receives a set of voltage information S303 required by all sub-blocks of the light diffuser 301, the light diffuser's driving unit 302 produces the required driving voltages S304 respectively corresponding to each of the sub-blocks and applies the voltages with a certain timing onto the corresponding sub-blocks W00-W45 of the light diffuser 301. The above-mentioned set of voltage information S303 is determined according to an original image without light-complementing of the light source 311 and a pre-flash image with light-complementing of the light source 311.

As shown by FIG. 3, the reflection energy ratios of the scene sub-blocks X12 and X13 are high and thereby the scene sub-blocks X12 and X13 are likely over-exposed. To avoid the over-exposure, the corresponding sub-blocks W12 and W13 of the light diffuser 301 should reduce the penetrations thereof to reduce the penetrated flash light energy so that the scene sub-blocks X12 and X13 get appropriate light-complementing. Referring to FIG. 3 again, the reflection energy ratios of the scene sub-blocks X30 and X45 are higher than that of X12 and X13, so that the scene sub-blocks X30 and X45 require weaker light-complementing of the flash light energy than that of X12 and X13, and the corresponding sub-blocks W30 and W45 need penetrations lower than that of X12 and X13. Only in this way, the scene sub-blocks X30 and X45 can get appropriate light-complementing.

In order to change the penetration of each of the sub-blocks of the light diffuser 301, the driving voltage of each of the sub-blocks needs to be changed. The light diffuser 301 herein can be, for example, polymer-dispersed liquid crystal display (PDLC Display), liquid crystal display (LCD) or LCD by adding PDLC droplets. It should be noted that the above-mentioned number of the sub-blocks is an exemplary one, which in fact the invention is not limited to.

Figure 4A:
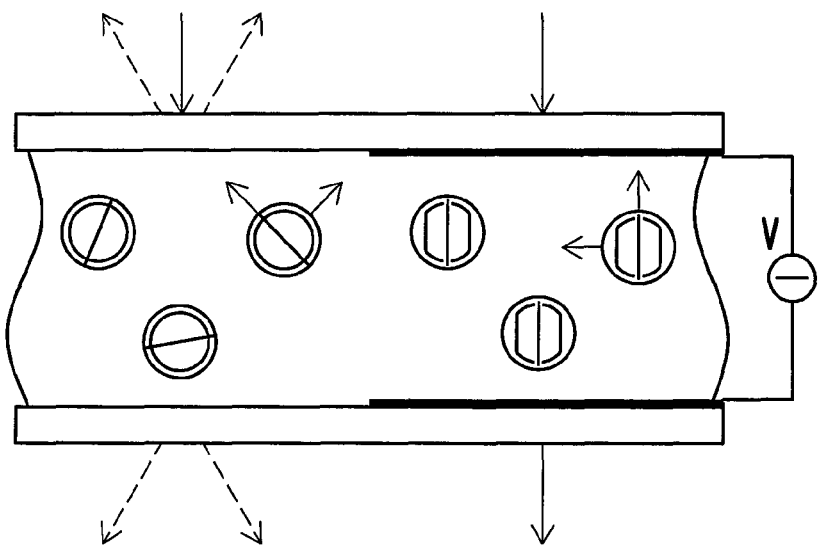
FIG. 4A is a schematic diagram for explaining a PDLC light through mode.
Figure 4B:
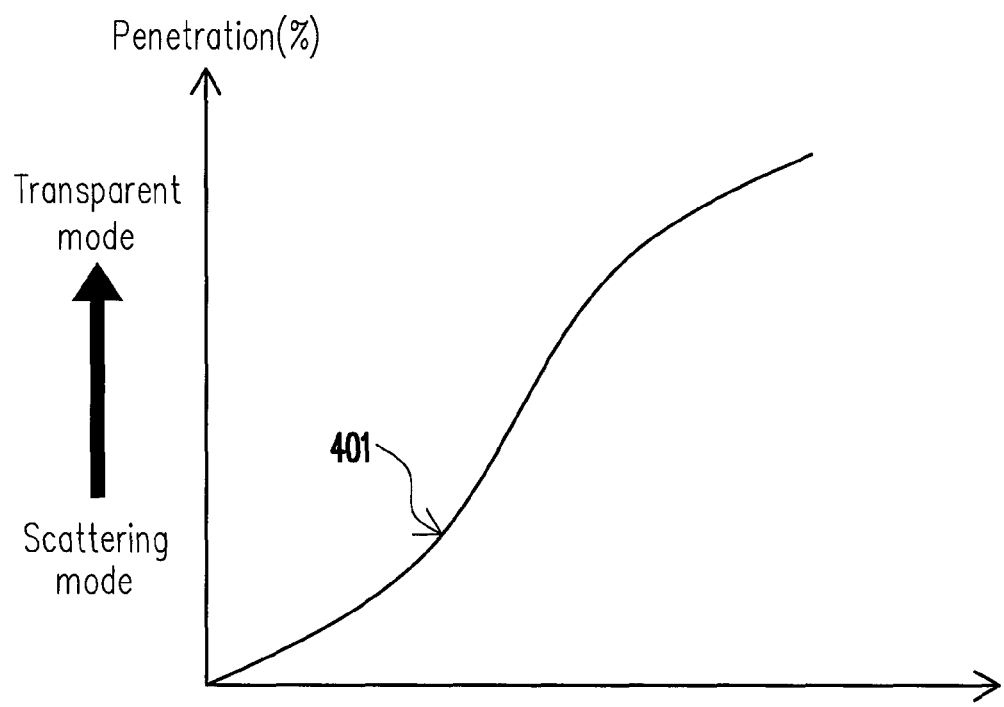
FIG. 4B is a plot for explaining a PDLC photoelectric characteristic.

In the embodiment, the light diffuser 301 is a PDLC-type one. FIG. 4A is a schematic diagram for explaining a PDLC light through mode and FIG. 4B is a plot for explaining a PDLC photoelectric characteristic. The PDLC is a condensed matter system formed liquid crystal and polymer. When no voltage is applied, the vector angles of the LC directors in the liquid crystal droplets (LC droplets) are randomly distributed in the polymer. At the time, the entered light would be scattered to present itself in opaque state and PDLC is operated in scattering mode. When a sufficient voltage is applied to the PDLC, the vector angles of the LC directors are distributed along the electric field direction, so that the light can pass through the PDLC. At the time, the PDLC is operated in transparent mode. When the external voltage is changed, the scattering extent and the penetrating extent for the light passing through the PDLC are accordingly changed. The larger the voltage, the less the scattered light is and the more the penetrated energy is; on the contrary, the less the voltage, the more the scattered light is and the less the penetrated energy is. The PDLC photoelectric characteristic can be represented by the curve 401 in FIG. 4B.

Figure 5:
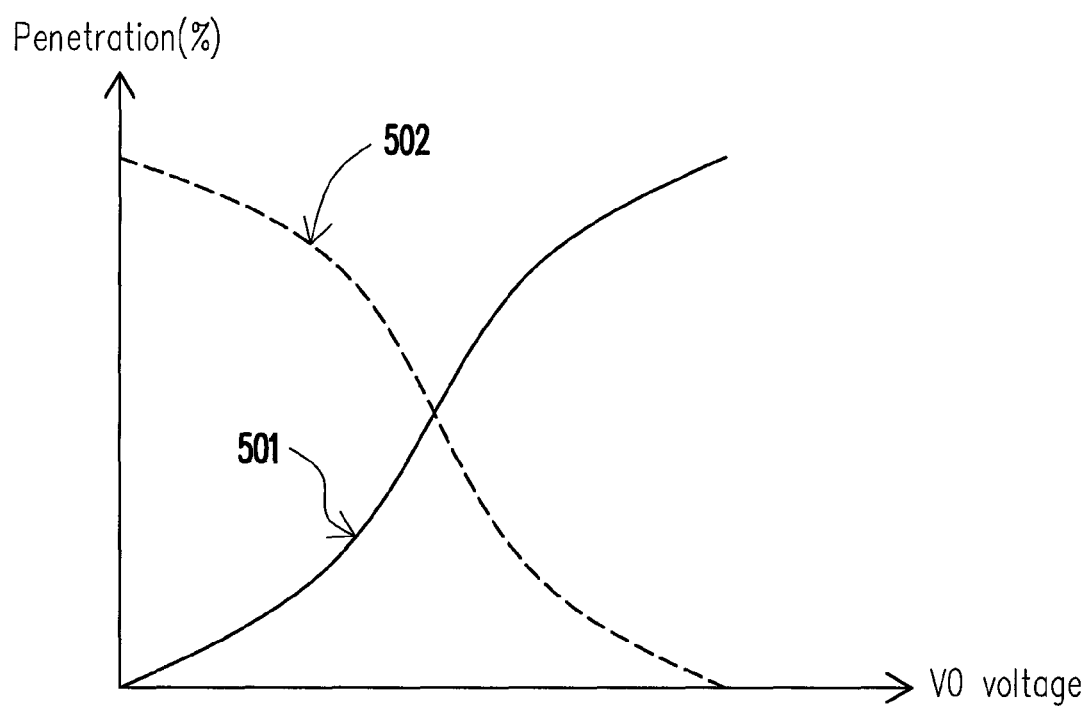
FIG. 5 is a plot for explaining the photoelectric characteristics of a normally black (NB) LCD and a normally white (NW) LCD.

In other embodiments, the light diffuser 301 can be implemented by using twisted nematic (TN), super-twisted nematic (STN), in-plane switching (IPS), vertical alignment (VA), multi-domain vertical alignment (MVA) and fringe field switching (FFS) technologies. Although the above-mentioned technologies are unable to scatter light, but the penetration thereof based on the technologies can be modulated through a varied voltage, and thus the above-mentioned technologies can be used in a light diffuser 301. FIG. 5 is a plot for explaining the photoelectric characteristics of a normally black (NB) LCD and a normally white (NW) LCD. In FIG. 5, a normally white (NW) LCD and a normally black (NB) LCD serve as two examples. For the NW LCD, a less voltage causes a higher penetration, as shown by the curve 502; for the NB LCD, a less voltage causes a lower penetration, as shown by the curve 501. Since PDLC has the light-scattering function, in following, the light diffuser 301 is, for example, based on the PDLC.

Figure 6A:
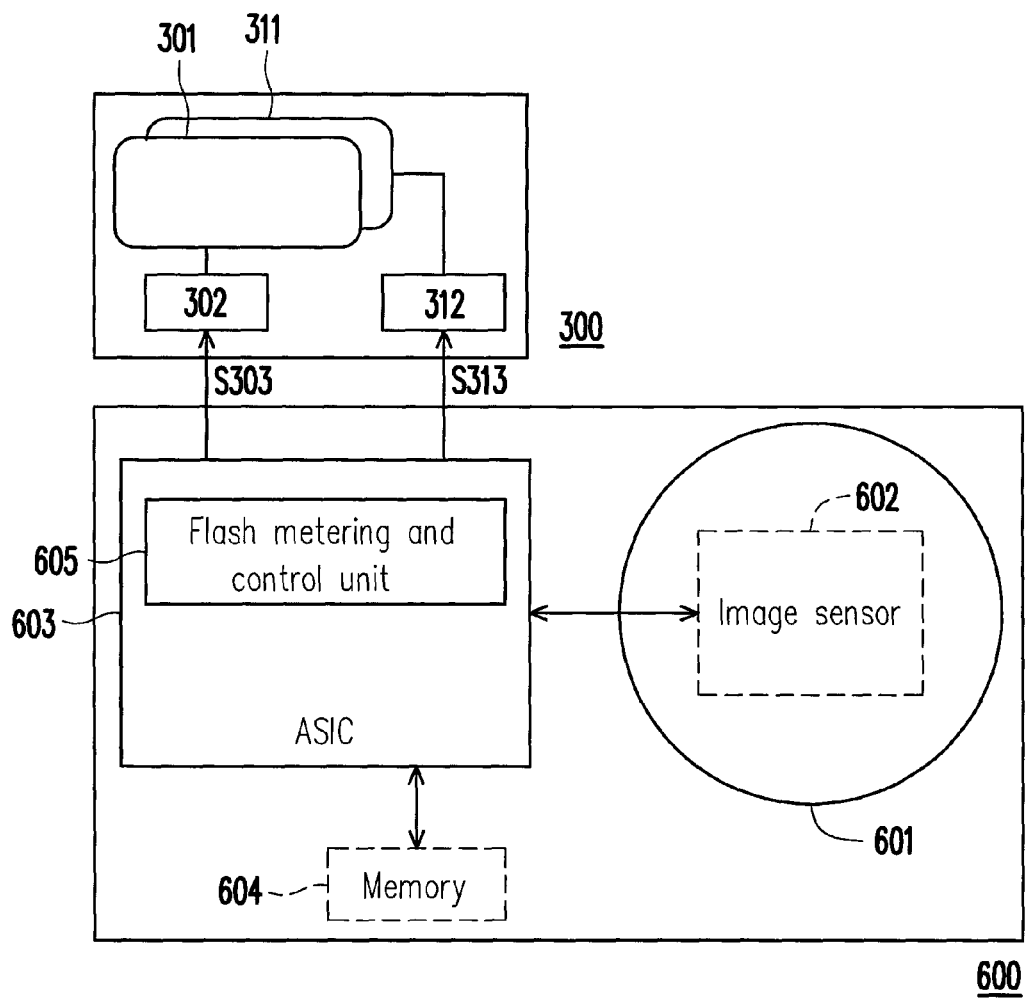
FIG. 6A is a schematic diagram of a digital camera with a plug-in flash light according to an embodiment of the invention.

The major application of the above-mentioned flash light device 300 is in an image-capturing system. FIG. 6A is a schematic diagram of a digital camera with a plug-in flash light according to one of the embodiments of the invention, in which the flash light device 300 is plugged in a digital image-capturing system, i.e., a digital camera.

As shown by FIG. 6A, the flash light device 300 of the invention is plugged in a digital camera. A camera body 600 includes a lens 601, an image sensor 602, a control and image-processing chip ASIC 603 (application-specific integrated circuit, briefly in ASIC), a memory 604 and other necessary components for implementing the digital camera's function (not shown in the figure). The ASIC 603 includes a flash metering and control unit 605 therein, and the flash metering and control unit 605 in the ASIC 603 can be implemented through a firmware, a hardware or a combination of firmware and hardware.

The plug-in flash light device 300 receives a set of voltage information S303 come from the camera body 600 to make the light diffuser's driving unit 302 produce driving voltages S304 required by all the sub-blocks. In addition, the flash light device 300 also receives a trigger signal S313 for triggering the light source's driving unit 312. The required driving voltages S304 corresponding to each of the sub-blocks in the light diffuser 301 is determined by a primary control chip of digital capturing system and the primary control chip of digital capturing system transmits the voltage information S303 to the light diffuser's driving unit 302.

To maintain the necessary and appropriate operations of the camera body 600 and the flash light device 300, there are other necessary hardware control interfaces between the flash light device 300 and the camera body 600, which are regular interfaces and thus are saved from showing.

Figure 6B:
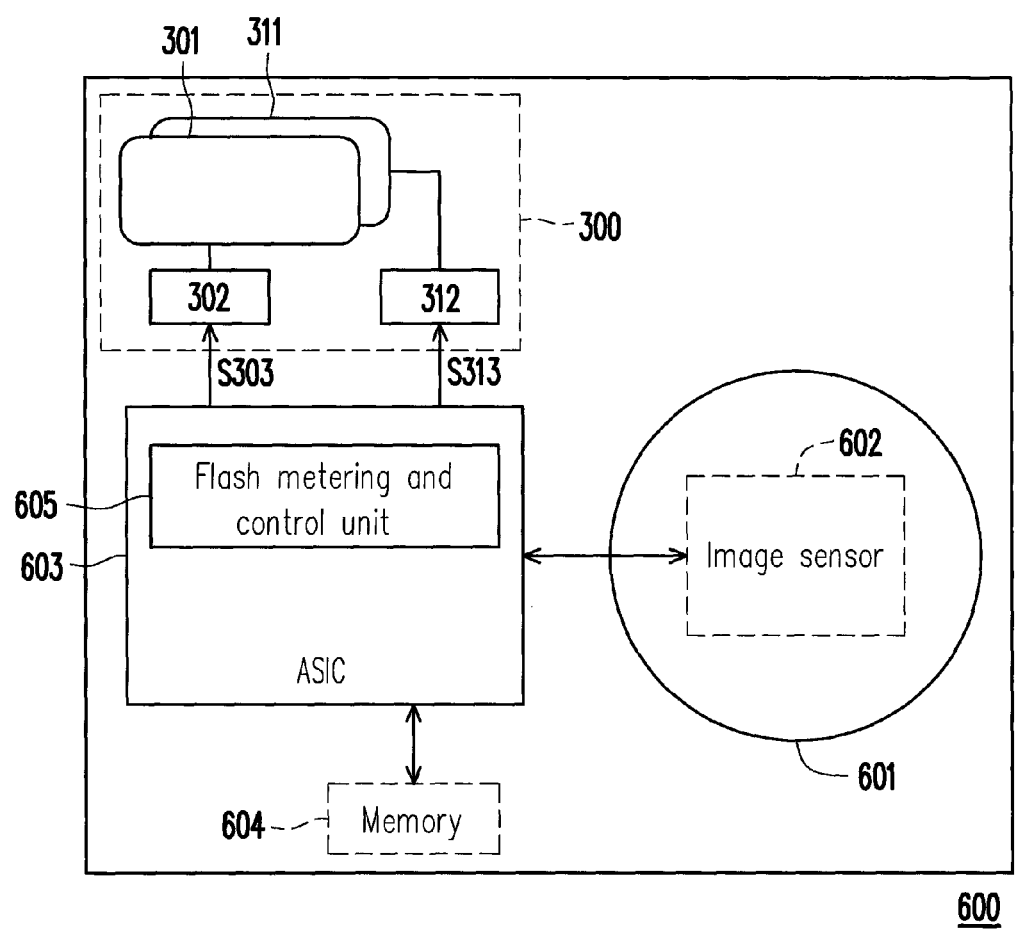
FIG. 6B is a schematic diagram of a digital camera with an embedded flash light according to an embodiment of the invention.

FIG. 6B is a schematic diagram of a digital camera with an embedded flash light device 300 according to an embodiment of the invention. Referring to FIG. 6B, except for the hardware interface for plugging-in the flash light, the function and the control steps are basically same as FIG. 6A.

Figure 7A:
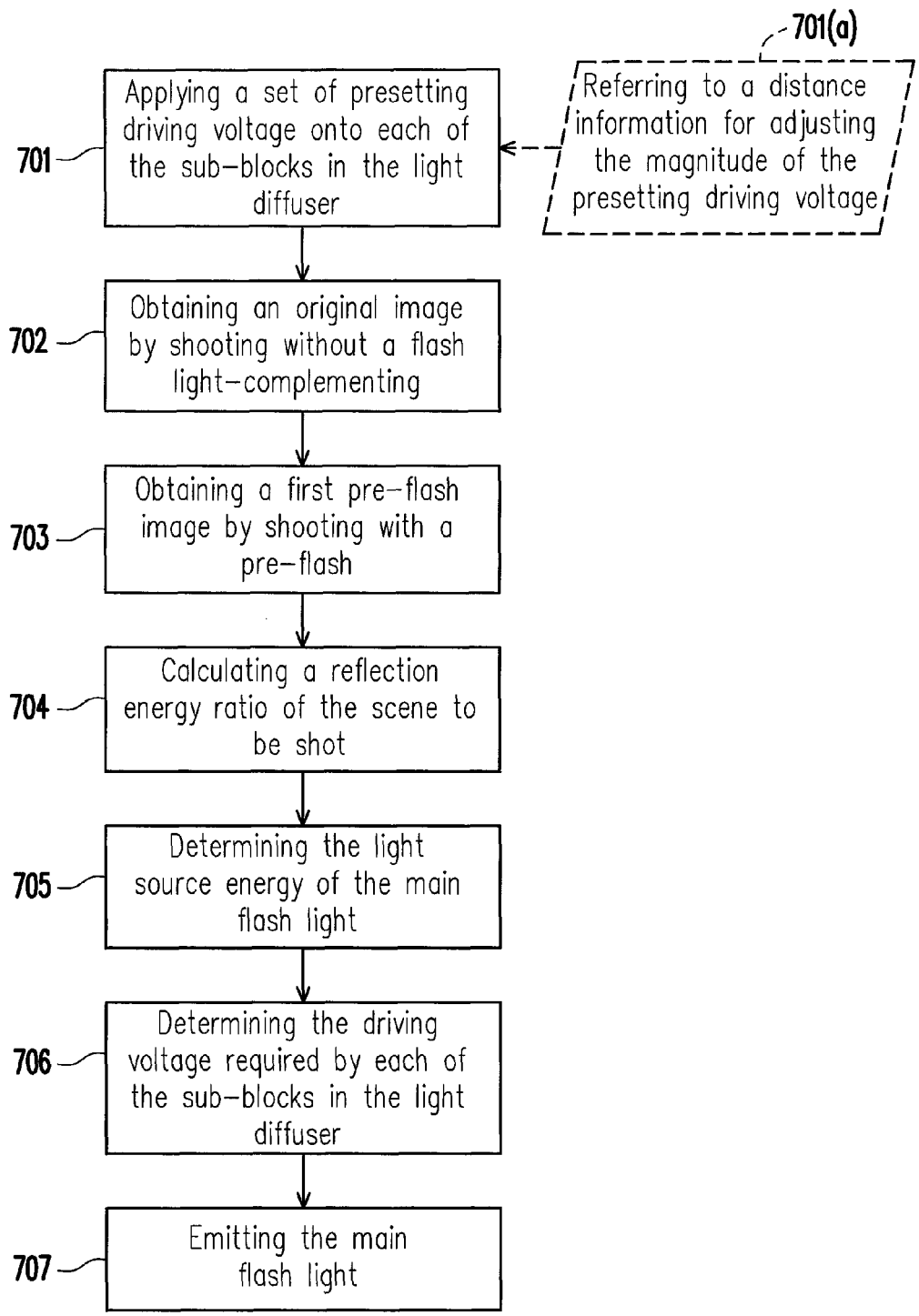
FIGS. 7A-7C are schematic flowcharts of a flash-controlling method according to the embodiments of FIGS. 6A and 6B.
Figure 7B:
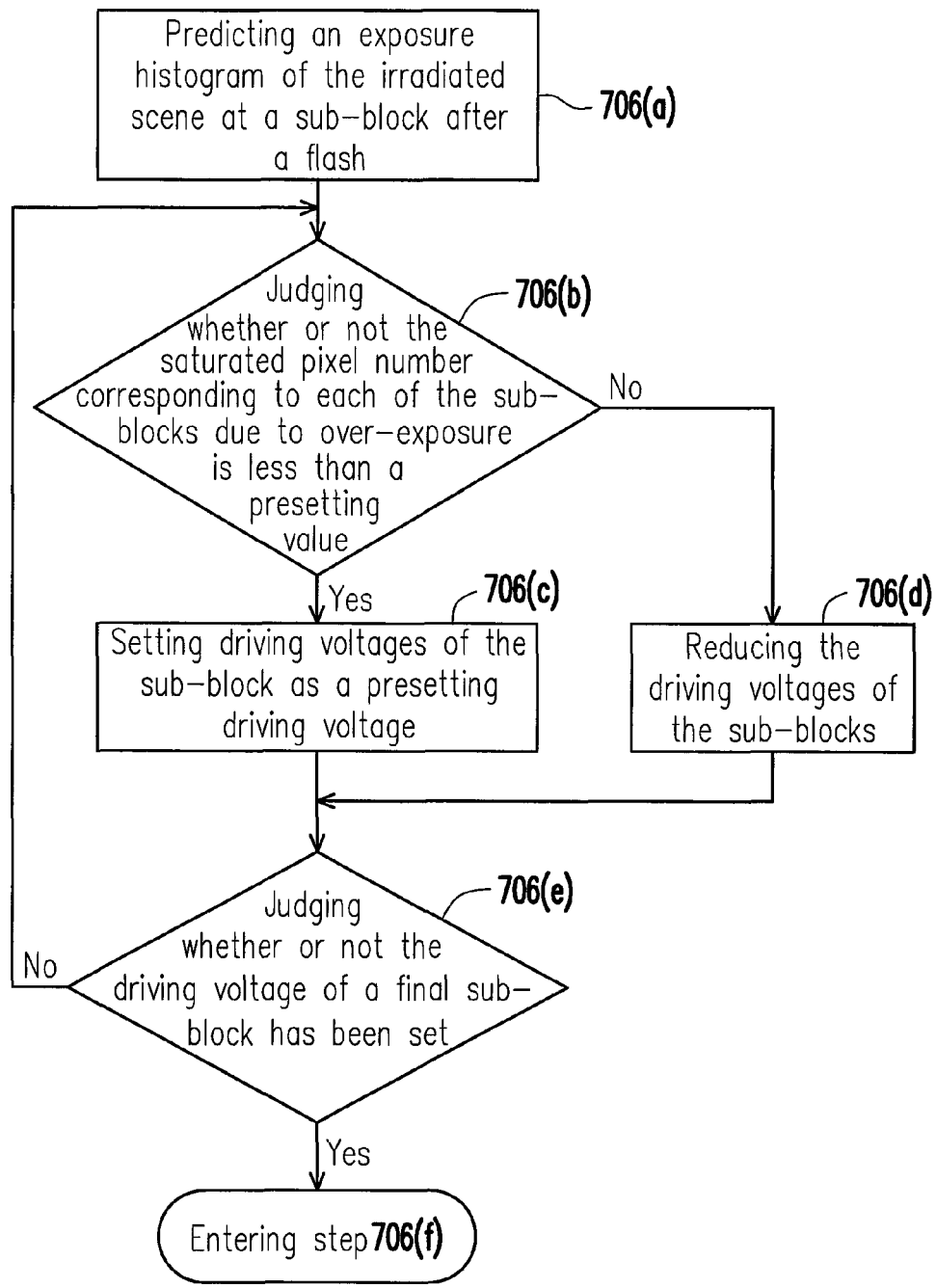
Figure 7C:
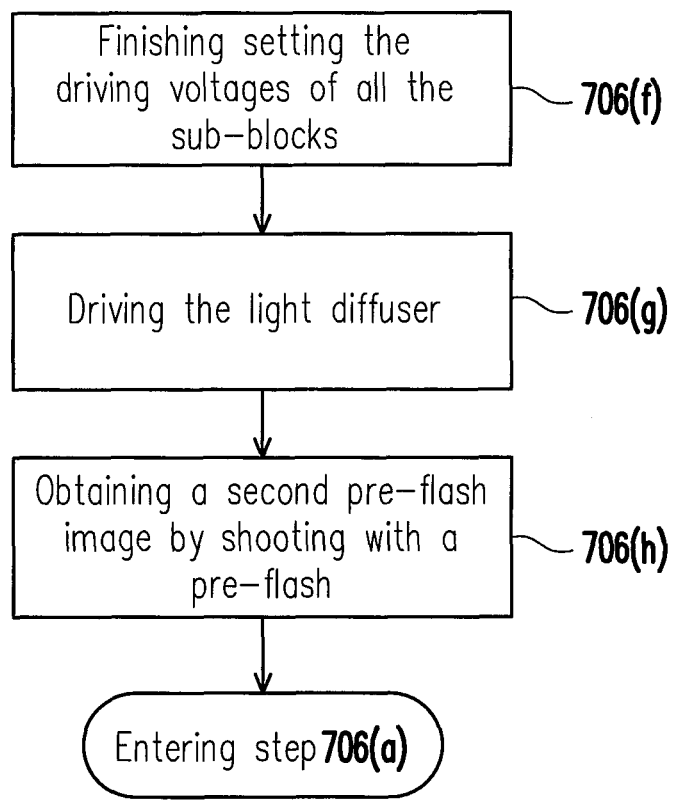

FIGS. 7A-7C are schematic flowcharts of a flash-controlling method according to the embodiments of FIGS. 6A and 6B. Referring to FIGS. 3, 6A and 7A, the primary control chip of digital capturing system performs following steps to determine the driving voltages of each of the sub-blocks in the light diffuser 301. First in step 701, the flash metering and control unit 605 notifies the light diffuser's driving unit 302 of applying a set of presetting driving voltages onto each of the sub-blocks in the light diffuser 301. The presetting driving voltages are related to the photoelectric characteristic of the light diffuser 301. If the driving voltage is zero, the light diffuser 301 allows light penetrating and the presetting driving voltage can be zero. In terms of the magnitude of the presetting driving voltage, in addition to the predetermined value, the flash metering and control unit 605 can refer to a received distance information (step 701(a)) for adjusting the magnitude of the presetting driving voltage, in which the distance information means the distance between the light diffuser and the object to be shot. Usually, when the distance is smaller (for example, a minor distance), the penetration of the light diffuser 301 needs a smaller value; i.e. for a NB light diffuser, the presetting value of the driving voltage should be lower. On the contrary, when the distance is larger (for example, 5 m), the penetration of the light diffuser 301 needs a larger value; i.e., for a NB light diffuser, the presetting value of the driving voltage should be higher.

After each of the sub-blocks in the light diffuser 301 is applied by a corresponding presetting driving voltage, the procedure goes to step 702, where the flash metering and control unit 605 obtains an original image imgX by shooting without a flash light-complementing. The original image imgX can be expressed by formula (1):

$$imgX(x, y) = \frac{S(x, y) \times T(x, y) \times R(x, y)}{r(x, y)^2} \quad \text{formula (1)}$$

wherein (x.y) is a different pixel position;

S(x, y) is the light source distribution of scene to be shot;

T(x, y) is the penetration corresponding to the light diffuser 301 after being applied by a predetermined driving voltage V(x.y);

R(x, y) is reflectivity of the object to be shot; and r(x, y) is distance between the scene to be shot and the image sensor 602 in the digital capturing system.

After that, as shown by step 703, the flash metering and control unit 605 further obtains a first pre-flash image imgY1 by shooting with a pre-flash for presetting the light source energy. The first pre-flash image imgY1 and the relationship thereof to imgX can be expressed by formula (2):

$$imgY1(x, y) = imgX(x, y) + \frac{Epre(x, y) \times T(x, y)^2 \times R(x, y)}{2r(x, y)^2} \quad \text{formula (2)}$$

wherein Epre(x,y) is the light source energy of the pre-flash light.

Then, as shown by step 704, a reflection energy ratio of the scene to be shot is calculated according to the exposure difference between the original image and the first pre-flash image.

Since Epre(x,y) and T(x, y) are given, reflection energy ratio of the object $R(x,y)/(2r(x,y)^2)$ corresponding to each pixel can be obtained according to formula (3):

$$\frac{R(x, y)}{2r(x, y)^2} = \frac{imgY1(x, y) - imgX(x, y)}{Epre(x, y) \times T(x, y)^2} \quad \text{formula (3)}$$

The reflection energy ratio is related to the reflectivity R(x, y) of the object to be shot and the distance r(x, y).

Further as shown by step 705, the light source energy of the main flash light Emain(x.y) is determined by one of the reflection energy ratio and the distance information or by a combination thereof.

Further as shown by step 706, the driving voltage S304 required by each of the sub-blocks in the light diffuser 301 is determined according to one of the reflection energy ratio and the distance information or by a combination thereof.

The detail for performing step 706 can refer to FIG. 7B. First, as shown by FIG. 706(a), an exposure histogram of the irradiated scene at a sub-block after a flash would be predicted, where the exposure value imgM(x.y) corresponding to each pixel of the image sensor after the light source 311 emits the light source energy Emain(x,y) is derived by formula (4); then, an exposure histogram of each of the sub-blocks is calculated:

$$imgM(x, y) = imgX(x, y) + \frac{Emain(x, y) \times T(x, y)^2 \times R(x, y)}{2r(x, y)^2} \quad \text{formula (4)}$$

Further as shown by step 706(b), it is judged whether or not the saturated pixel number corresponding to each of the sub-blocks in the image after light-complementing due to over-exposure is less than a presetting value; if the saturated pixel number is less than the presetting value, as shown, for example, the sub-block W00 in FIG. 3, the driving voltage S304 of the sub-block is set as a presetting driving voltage (step 706(c)); otherwise, if the saturated pixel number of the sub-block is not less than the presetting value, the driving voltage S304 corresponding to each of the sub-blocks in the light diffuser is determined according to the statistic result of step 706(b) and an LUI or formula, in which the more the over-exposure pixel number, the lower the penetration of the light diffuser 301 needs to be. For example, in FIG. 3, for the sub-blocks W12 and W13 corresponding to the scene sub-blocks X12 and X13 and the sub-blocks W30-W35 and W40-W45 respectively corresponding to the scene sub-blocks X30-X35 and X40-X45, the driving voltages S304 of the sub-blocks need to be reduced to lower down the penetrations of the sub-blocks (step 706(d)). After that, as shown by step 706(e), it is judged whether or not the driving voltage of a final sub-block has been set. If not all the driving voltages of all the sub-blocks have been set, the procedure goes to step 706(a) to adjust the driving voltage of next sub-block; if all the driving voltages of all the sub-blocks have been set, the procedure goes to step 706(f) in FIG. 7C.

When the saturated pixel numbers corresponding to each of the sub-blocks are less than the presetting value, step 707 in FIG. 7A is performed, where the main flash light is emitted. On the contrary, when not all the saturated pixel numbers corresponding to each of the sub-blocks are less than the presetting value, there are still some unacceptable over-exposure regions on the frame after emitting the main flash light, so that it needs to re-determine the penetration of each of the sub-blocks, i,e to re-determine the driving voltage of each of the sub-blocks. At the time, as shown by step 706(g) in FIG. 7C, a set of newest driving voltages S304 obtained in steps 706(a)-706(e) are used to drive the light diffuser 301, followed by emitting another pre-flash in step 706(h) to obtain a second pre-flash image imgY2 shot during the pre-flashing. Then, the procedure goes back to step 706(a) to re-determine a set of driving voltages S304. Through several repeated operations, the procedure would end until the condition of step 707 is satisfied.

Finally, as shown by step 707 in FIG. 7A, the driving voltages S304 of all the sub-blocks obtained in step 706 are applied to the corresponding sub-blocks of the light diffuser 301 through the light diffuser's driving unit 302 so as to adjust the light energies after the flash light penetrates all the sub-blocks and further to conduct light-complementing by emitting the main flash light.

As the description above, since the penetrations of the sub-blocks W12 and W13 corresponding to the scene sub-blocks X12 and X13 and the sub-blocks W30-W35 and W40-W45 respectively corresponding to the scene sub-blocks X30-X35 and X40-X45 are reduced, the flash light energies arrived at the scene sub-blocks X12 and X13, X30-X35 and X40-X45 get smaller after emitting the main flash light and thereby the over-exposure situation can be avoided.

Figure 8:
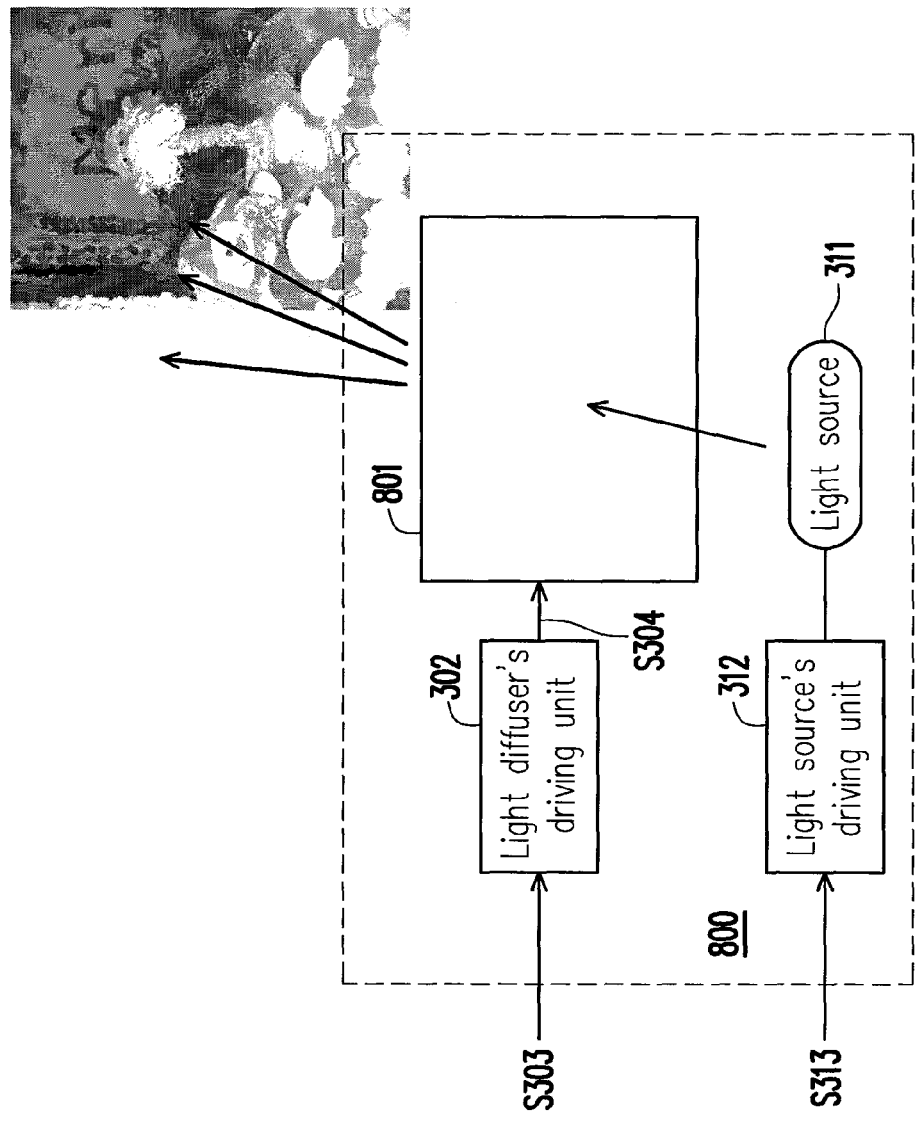
FIG. 8 is a schematic diagram of a flash light device according to another embodiment of the invention.

It should be noted that in some of embodiments, to reduce the manufacturing cost of the flash light device 300, another way is to reduce the number of sub-blocks of the light diffuser 301. FIG. 8 is a schematic diagram of a flash light device according to another embodiment of the invention. Referring to FIG. 8, a flash light device 800 has a unique from the flash light device 300 that the light diffuser 801 in the flash light device 800 is not formed by a plurality of sub-blocks, instead, the light diffuser 801 is formed by one block only.

The embodiment of FIG. 8 can be used in a plug-in or embedded digital capturing system, and the configurations can be shown by FIGS. 6A and 6B except the flash light device 300 in the first embodiment of the invention is replaced by the flash light device 800 of the embodiment of FIG. 8. At the time, since the light diffuser 601 is formed by one block and accordingly, the voltage information S303 contains one (instead of a set) driving voltage S304. In addition, the flash metering and control unit 605 merely needs to determine one driving voltage S304.

Figure 9A:
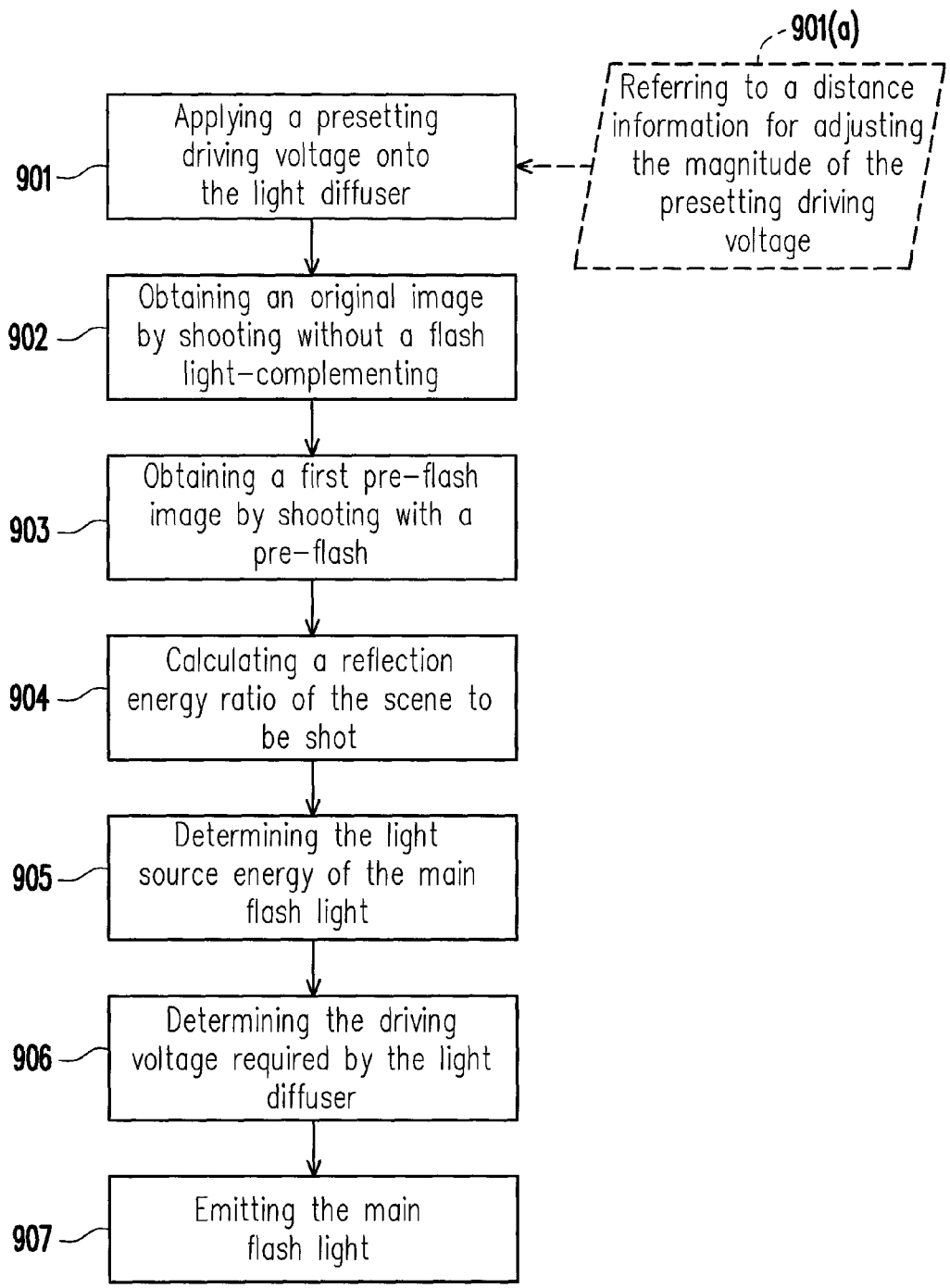
FIGS. 9A-9C are schematic flowcharts of a flash-controlling method according to the embodiment of FIG. 8.
Figure 9B:
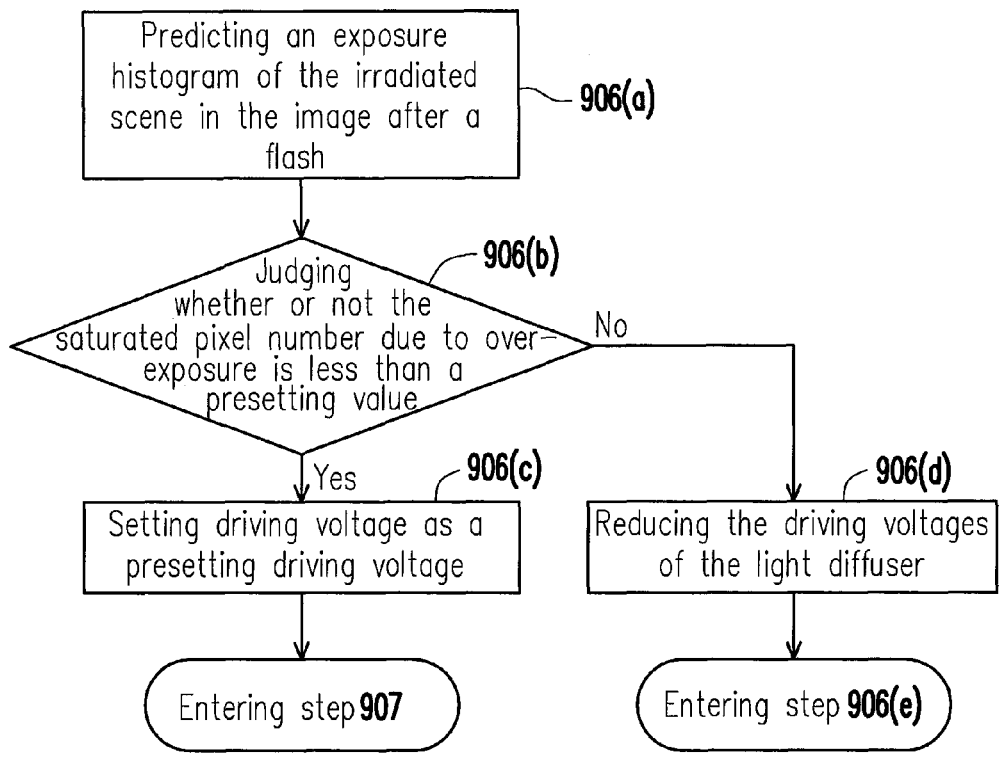
Figure 9C:
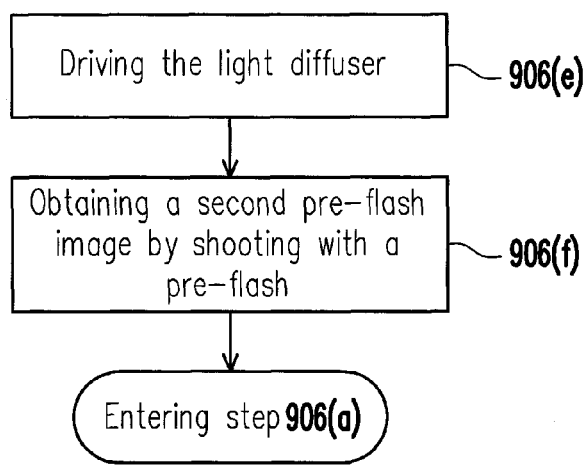

FIGS. 9A-9C are schematic flowcharts of a flash-controlling method according to the embodiment of FIG. 8. Referring to FIGS. 8 and 9A, first, as shown by step 901, the flash metering and control unit 605 notifies the light diffuser's driving unit 802 of applying a presetting driving voltage onto the light diffuser 801, in which the presetting driving voltage is related to the photoelectric characteristic of the light diffuser 801: if when the driving voltage of zero allows light penetrating the light diffuser 801, the presetting driving voltage can be zero. In terms of the magnitude of the presetting driving voltage, in addition to the predetermined value, the flash metering and control unit 605 can refer to a received distance information (step 901(a)) for adjusting the magnitude of the presetting driving voltage, in which the distance information means the distance between the light diffuser and the object to be shot. Usually, when the distance is smaller (for example, a minor distance) and at the time, the penetration of the light diffuser 801 needs a smaller value; i.e. for a NB light diffuser, the presetting value of the driving voltage should be lower. On the contrary, when the distance is larger (for example, 5 m), the penetration of the light diffuser 801 needs a larger value; i.e., for a NB light diffuser, the presetting value of the driving voltage should be higher.

After the light diffuser 801 is applied by a corresponding presetting driving voltage, the procedure goes to step 902, where the flash metering and control unit 605 obtains an original image imgX by shooting without a flash light-complementing. After that, as shown by step 903, the flash metering and control unit 605 further obtains a first pre-flash image imgY1 by shooting with a pre-flash.

Then, as shown by step 904, a reflection energy ratio of the scene to be shot is calculated according to the exposure difference between the original image and the first pre-flash image. The reflection energy ratio is related to the reflectivity of the object to be shot, the surface processing and the distance and the ratio represents the light energy ratio of the reflected light.

Further as shown by step 905, the light source energy of the main flash light is determined by one of the reflection energy ratio and the distance information or by a combination thereof.

Further as shown by step 906, the driving voltage S304 required by the light diffuser 801 is determined according to one of the reflection energy ratio and the distance information or by a combination thereof.

The detail for performing step 906 can refer to FIG. 9B. First, as shown by FIG. 906(a), an exposure histogram of the irradiated scene in the image after a flash would be predicted. Then as shown by step 906(b), it is judged whether or not the saturated pixel number due to over-exposure is less than a presetting value; if the saturated pixel number is less than the presetting value, the driving voltages S304 is set as a presetting driving voltage (step 906(c)) and step 907 of FIG. 9A is performed; otherwise, if the saturated pixel number is not less than the presetting value, the driving voltage S304 of the light diffuser is determined according to the statistic result of step 906(b) and an LUI or formula so as to lower down the penetrations of the light diffuser 801 (step 906(d)), in which the more the over-exposure pixel number, the lower the penetration of the light diffuser 801 needs to be.

After that, as shown by step 906(e) in FIG. 9C, a newest driving voltages S304 obtained in step is used to drive the light diffuser 801, followed by emitting another pre-flash in step 906(f) to obtain a second pre-flash image imgY2 shot during the pre-flashing. Then, the procedure goes back to step 906(a) to re-determine a driving voltage S304. Through several repeated operations, the procedure would end until the condition of step 907 is satisfied.

Finally, as shown by step 907 in FIG. 9A, the driving voltage S304 obtained in step 006 are applied to the light diffuser 801 through the light diffuser's driving unit 802 so as to adjust the light energies after the penetrated flash light and further to conduct light-complementing by emitting the main flash light.

In summary, the invention controls a driving voltage corresponding to each of the sub-blocks in the light diffuser according to one of the reflection energy extent of the scene to be shot and the distance information or by a combination thereof so as to adjust the light energy of the flash light after penetrating each of the sub-blocks, so that each object in the e scene to be shot respectively obtains appropriate light-complementing and further reduces the over-exposure pixel thereof.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A flash light device, comprising: a light source;
a light source's driving unit, coupled to the light source and receiving a trigger signal to drive the light source for emitting light energy;
a light diffuser, disposed in front of the light source and comprising a plurality of first sub-blocks, wherein each of the first sub-blocks is respectively controlled by a corresponding driving voltage so as to adjust light penetration energy of each of the first sub-blocks; and
a light diffuser's driving unit, coupled to the light diffuser, receiving a set of voltage information and producing and providing the driving voltage corresponding to each of the first sub-blocks according to the set of voltage information, the driving voltage corresponding to each of the first sub-blocks in the light diffuser is determined by a primary control chip of digital capturing system through performing following steps:
(a) capturing an original image without light-complementing of the light source;
(b) capturing a first pre-flash image with light-complementing by using a presetting first light source energy;
(c) deriving reflection energy ratio of each pixel by using the original image and the first pre-flash image;
(d) determining a second light source energy according to the result of step (c);
(e) deriving exposure value of each pixel of an image after light-complementing with the second light source energy according to the results of steps (c) and (d), wherein the image after light-complementing with the second light source energy comprises a plurality of second sub-blocks corresponding to the plurality of the first sub-blocks of the light diffuser; and
(f) determining the driving voltage of each of the first sub-blocks according to the result of step (e); wherein the set of voltage information is for indicating the required driving voltage corresponding to each of the first sub-blocks in the light diffuser, wherein the driving voltage is determined according to the original image without light-complementing of the light source and the first pre-flash image with light-complementing of the light source.

2. The flash light device as claimed in claim 1, wherein the light diffuser's driving unit is further coupled to the primary control chip of digital capturing system; wherein
the required driving voltage corresponding to each of the first sub-blocks in the light diffuser is determined by the primary control chip of digital capturing system, and the primary control chip of digital capturing system transmits the required driving voltage corresponding to each of the first sub-blocks to the light diffuser's driving unit.

3. The flash light device as claimed in claim 1, wherein step (f) performed by the primary control chip of digital capturing system further comprises:
(g) calculating a number of over-exposed pixels in each the second sub-block in the image after light-complementing with the second light source energy; and
(h) determining driving voltage of each of the first sub-blocks according to the result of step (g) and a lookup table (LUT) or a formula; wherein the more the number of over-exposed pixels in the second sub-block is, the lower the penetration of the corresponding first sub-block of the light diffuser is.

4. The flash light device as claimed in claim 1, wherein the light diffuser is polymer-dispersed liquid crystal display (PDLC Display), liquid crystal display (LCD) or LCD by adding PDLC droplets.

5. A flash light device, comprising: a light source, emitting a flash light;
a light source's driving unit, coupled to the light source and receiving a trigger signal to drive the light source for emitting light energy;
a light diffuser, receiving the flash light, wherein light penetration energy of the light diffuser is controlled by a driving voltage; and
a light diffuser's driving unit, coupled to the light diffuser, receiving a voltage information and producing and providing the driving voltage required by the light diffuser according to the voltage information, the driving voltage of the light diffuser is determined by a primary control chip of digital capturing system through performing following steps:
(a) capturing an original image without light-complementing of the light source;
(b) capturing a first pre-flash image with light-complementing by using a presetting first light source energy;
(c) deriving reflection energy ratio of each pixel by using the original image and the first pre-flash image;
(d) determining a second light source energy according to the result of step (c);
(e) deriving exposure value of each pixel of an image after light-complementing with the second light source energy according to the results of steps (c) and (d); and
(f) determining the driving voltage of the light diffuser according to the result of (e); wherein
the voltage information is determined according to the original image without light-complementing of the light source and the first pre-flash image with light-complementing of the light source.

6. The flash light device as claimed in claim 5, wherein the light diffuser's driving unit is further coupled to the primary control chip of digital capturing system, wherein the driving voltage required by the light diffuser is determined by the primary control chip of digital capturing system, and the primary control chip of digital capturing system transmits the driving voltage required by the light diffuser to the light diffuser's driving unit.

7. The flash light device as claimed in claim 5, wherein step (f) performed by the primary control chip of digital capturing system further comprises:
(g) calculating a number of over-exposed pixels in the image after light-complementing with the second light source energy; and
(h) determining driving voltage of the light diffuser according to the result of step (g) and a lookup table (LUT) or a formula; wherein the more the number of over-exposured pixels is, the lower the penetration of the light diffuser is.

8. The flash light device as claimed in claim 5, wherein the light diffuser is polymer-dispersed liquid crystal display (PDLC Display), liquid crystal display (LCD) or LCD by adding PDLC droplets.

* * * * *